July 11, 1933.   E. T. J. TAPP ET AL   1,917,469
SELF PROPELLED ROAD VEHICLE
Filed April 10, 1931
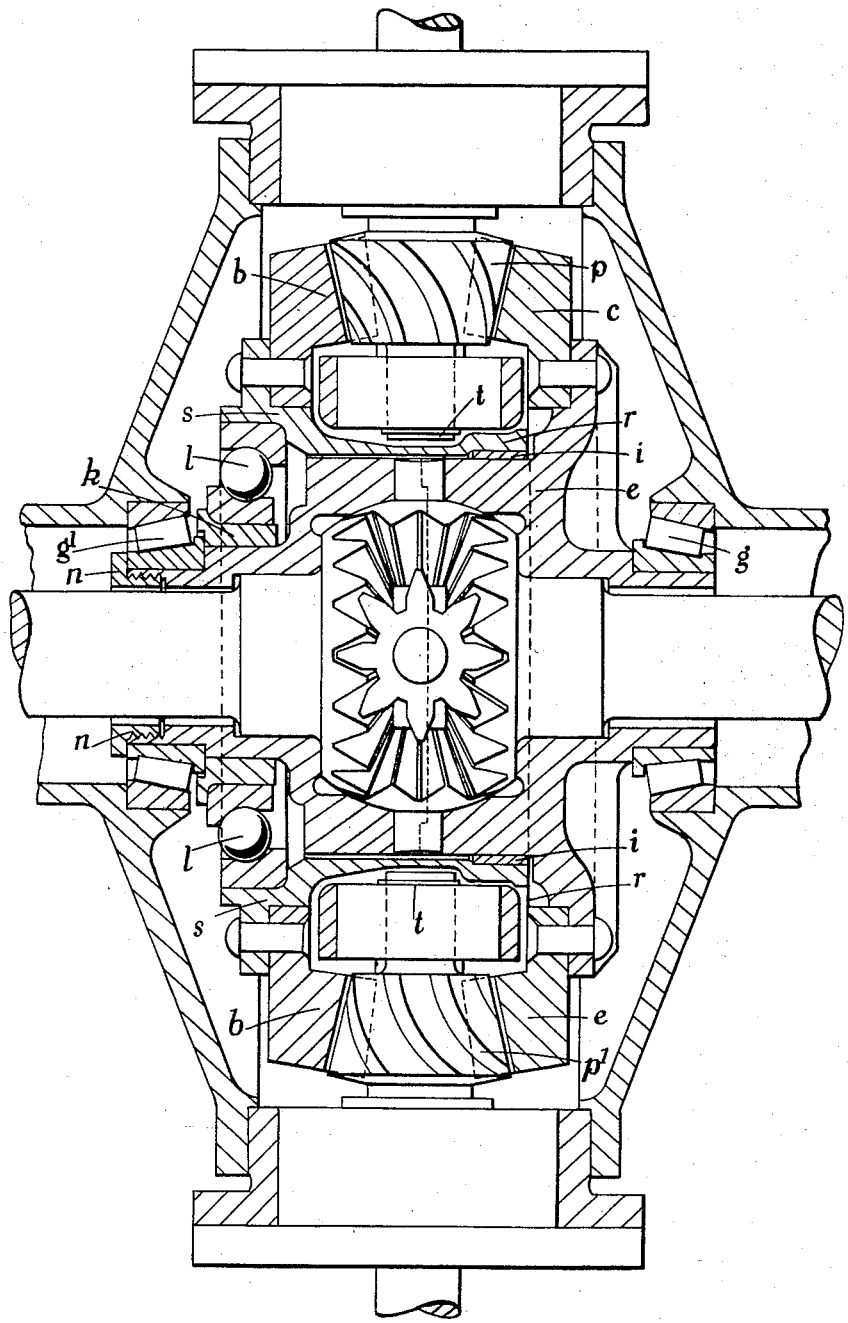
INVENTOR
Ernest T. J. Tapp, and
Percy J. R. Tapp.
BY
William C. Sinton.
ATTORNEY Patented July 11, 1933

1,917,469

UNITED STATES PATENT OFFICE

ERNEST THOMAS JAMES TAPP AND PERCY JOHN RUTTY TAPP, OF LONDON, ENGLAND

SELF-PROPELLED ROAD VEHICLE

Application filed April 10, 1931, Serial No. 529,144, and in Great Britain April 17, 1930.

This invention relates to road vehicles propelled by more than one axle of the bevel gear driven type and wherein the forward of two driving axles is so constructed to accommodate a driven bevel pinion in addition to the normal driving pinion, said driven pinion deriving power from the driving pinion by two bevel wheels meshing with both driving and driven pinions.

The object of this invention is to provide an improved construction of driving mechanism of the above mentioned type whereby stress in the teeth and bearings of the constructions are considerably reduced.

According to this invention, both bevel wheels are mounted on the differential cage, one being rigidly fixed to the said cage and the other free to revolve on it, thus enabling both driving and driven pinions to transmit and receive power on both sides and consequently share the load of a double number of teeth, and reduce the stresses in consequence.

It will be seen that the loads on the bearings supporting the differential cage are reduced by virtue of the fact that the upward climbing tendency of the pinion on one bevel wheel will be neutralized, or partially so, by its downward climbing tendency on the other.

The said free bevel wheel is preferably carried on a sleeve extending over and surrounding the cage containing the differential gear, the said sleeve being as long as can be conveniently made and extending as close to the fixed wheel as possible, one bearing being placed in or on one extremity of the sleeve and another bearing on or in the other extremity.

One of these bearings may also be capable of taking thrust load of the free wheel away from the bevel pinions. In some constructions the sleeve may be of sufficient length to form a suitable bearing and the said second bearing being omitted, in which case, a separate thrust bearing must be provided.

In one convenient construction, for instance, a plain bearing may be formed in or on the sleeve and a combined thrust and journal ball roller bearing placed at the outer extremity of the sleeve to which the free wheel is attached, thus bringing the said ball or roller bearing closely under the tooth line, so that it takes the major portion of the load imposed on it by the drive, the bearing in the sleeve acting more as a steadying means and carrying only a light load, which since the bearing area afforded by the large diameter of the cage is subject to very little wear. Since both crown wheels are entirely and completely supported in the axle casing by the bearings which carry the differential cage, no additional strain is imposed on the said casing and the opposing driving forces of the two bevel or crown wheels reduces the stresses actually imposed on the said bearing supporting the cage.

It is preferable that a small amount of side float be permitted in the cage relative to the pinions or vice versa, this side play being obtained either by side tolerance in the bearings supporting the differential cage, by a sliding movement allowed in or on the bearings, or alternatively one of the pinions may be allowed to float slightly.

Referring now to the accompanying drawing, which is a sectional plan view of one form of driving mechanism constructed in accordance with this invention. $c$ is the crown wheel meshing with the driving pinion $p$ and the driven pinion $p^1$. The said crown wheel is suitably mounted on the cage $e$ carrying the differential gear for the centre axle.

$b$ is the additional bevel wheel which is carried on the sleeve $s$ mounted on two bearings $l, i$, surrounding the exterior of the cage $e$. The bearing $l$ is a combined thrust and journal ball bearing and $i$ is a plain bearing. The bearing $l$ is disposed closer in line with the teeth of the bevel wheel $b$ and takes the major portion of the load. The bearing $i$ takes a smaller load, the reason for this arrangement being that, owing to the construction there is very little space for a bearing at the end of the sleeve $s$ where the bearing $i$ is shewn, owing to the proximity of the bevel pinion shafts and bearings.

The sleeve $s$, it will be noticed, is specially contoured so as to allow clearance where the shaft protrudes at $t$ from the said bearing, and a smaller strengthening rib $r$ on the end of the sleeve $s$ to stiffen it since there is no room for great thickness throughout its length.

Where the bearing $l$ is placed, however, more room is available, owing to the cage being reduced at this point.

In order to make up the difference between the inside diameter of the bearing and the outside diameter of the cage at this point, a bush or collar $k$ is used, and is prevented from moving laterally under the side thrust of the bevel wheel by being placed to abut against the inner ring of the bearing $g'$, which is in turn retained by the flanged ring nut $n$ screwed into the end of the differential cage. Adjusting washers may, if necessary, be placed between the said bush $k$ and the inner ring of the bearing $g$ in order to vary slightly the actual position of the bush $k$ to obtain correct mesh of the additional wheel with the bevel pinions. A smaller bearing may, of course, be used in place of $l$, and the bush $k$ omitted.

The reason for mounting the bevel wheel $b$ on the differential cage $e$ is in order to reduce the loads on the bearings supporting the differential cage, since the pressure on the crown wheel $c$ away from the pinion, due to the drive, will normally cause a thrust on the bearing $g$ which is here shown to be of the taper roller type.

The bevel wheel $b$ however, also has a corresponding thrust away from the bevel pinion, and this being transmitted to the cage by the ball bearing $l$, neutralizes, or partially so, the thrust already referred to.

It will also be seen that the journal loads on the bearings $g$ and $g^1$, carrying the cage, are also relieved in as much as the upward or downward pressure of the crown wheel will be neutralized, or partially so, by the inverse upward or downward pressure of the extra bevel wheel.

The loads on the driving and driven pinion bearings will also be reduced for the same reason.

What we claim is:—

1. In a differential drive mechanism, a differential cage, a driving axle extending from said cage, a bevel driving pinion, a bevel driven pinion for the purpose of conveying power to a second driving axle, a pair of bevel wheels mounted on the differential cage and meshing with both driving and driven pinions, one of said wheels being rigidly fixed to said cage to rotate therewith, a sleeve extending over and surrounding the differential cage and carrying the other of said wheels whereby the same may be free to rotate upon said cage, and a combined thrust and journal bearing supporting said sleeve at its outer end.

2. In a differential drive mechanism, a differential cage, a driving axle extending from said cage, a bevel driving pinion, a bevel driven pinion for the purpose of conveying power to a second driving axle, a pair of bevel wheels mounted on the differential cage and meshing with both driving and driven pinions, one of said wheels being rigidly fixed to said cage to rotate therewith, a sleeve extending over and surrounding the differential cage and carrying the other of said wheels whereby the same may be free to rotate upon said cage, and a thrust bearing supporting said sleeve at its outer end, said thrust bearing abutting direct against the bearing portion of the differential cage.

3. In a differential drive mechanism, a differential cage, a driving axle extending from said cage, a bevel driving pinion, a bevel driven pinion for the purpose of conveying power to the second driving axle, a pair of bevel wheels mounted on the differential cage and meshing with both driving and driven pinions, one of said wheels being rigidly fixed to said cage to rotate therewith, a sleeve extending over and surrounding the differential cage and carrying the other of said wheels whereby the same may be free to rotate upon said cage, a thrust bearing supporting said sleeve at its outer end, and means between said thrust bearing and the inner bearing portion of the differential cage whereby to prevent lateral movement of said thrust bearing.

In testimony whereof they affix their signatures.

ERNEST THOMAS JAMES TAPP.
PERCY JOHN RUTTY TAPP.